United States Patent [19]

Bauer

[11] 4,416,075
[45] Nov. 22, 1983

[54] ILLUMINATED CAKE DECORATION

[76] Inventor: Ronald E. Bauer, 2215 Dawes, Overland, Mo. 63114

[21] Appl. No.: 315,959

[22] Filed: Oct. 28, 1981

[51] Int. Cl.³ .............................................. G09F 19/00
[52] U.S. Cl. ...................................... 40/546; 40/555;
40/2 G; 428/7; 428/11; D11/184
[58] Field of Search ............... 40/553, 903, 564, 565,
40/572, 573, 574, 575, 576, 577, 578, 581, 555,
546, 2 G; 362/806, 812; 428/7, 11, ; 426/132,
90, 104; D26/10, 104, 105, 51; D11/184

[56] References Cited

U.S. PATENT DOCUMENTS

| D. 267,589 | 1/1983 | Worley | D11/184 |
|---|---|---|---|
| 1,707,539 | 4/1929 | Propp | 428/7 |
| 1,847,687 | 3/1932 | Biertuenpfel | 428/7 |
| 2,439,178 | 4/1948 | Marchand | 428/7 |
| 3,308,705 | 3/1967 | Shinnick | D11/184 |
| 3,892,959 | 7/1975 | Palles | 362/31 |

Primary Examiner—Gene Mancene
Assistant Examiner—John Weiss
Attorney, Agent, or Firm—Kalish & Gilster

[57] ABSTRACT

A self-containing accessory providing illuminated decoration of a cake or like, comprising, in certain preferred versions, an externally applied decorative cover of eye-defining light-transmissive portions and including a module, secured to the underside of said cover, to provide flashing illumination by means of an electric light source, battery, and interconnecting circuitry contained therein; the module being positioned such as to locate the electric light source beneath or within said light-transmissive portions so as to give the visual appearance of winking eyes; a recess being within the cake to receive the module. Another embodiment carries circuitry beneath the cake with illumination being provided atop a probe-like extension inserted upward from beneath said cake. Another embodiment achieves illumination by use of phosphorescent devices. Yet another embodiment achieves illumination by filtering light through various light-transmissive materials.

19 Claims, 31 Drawing Figures

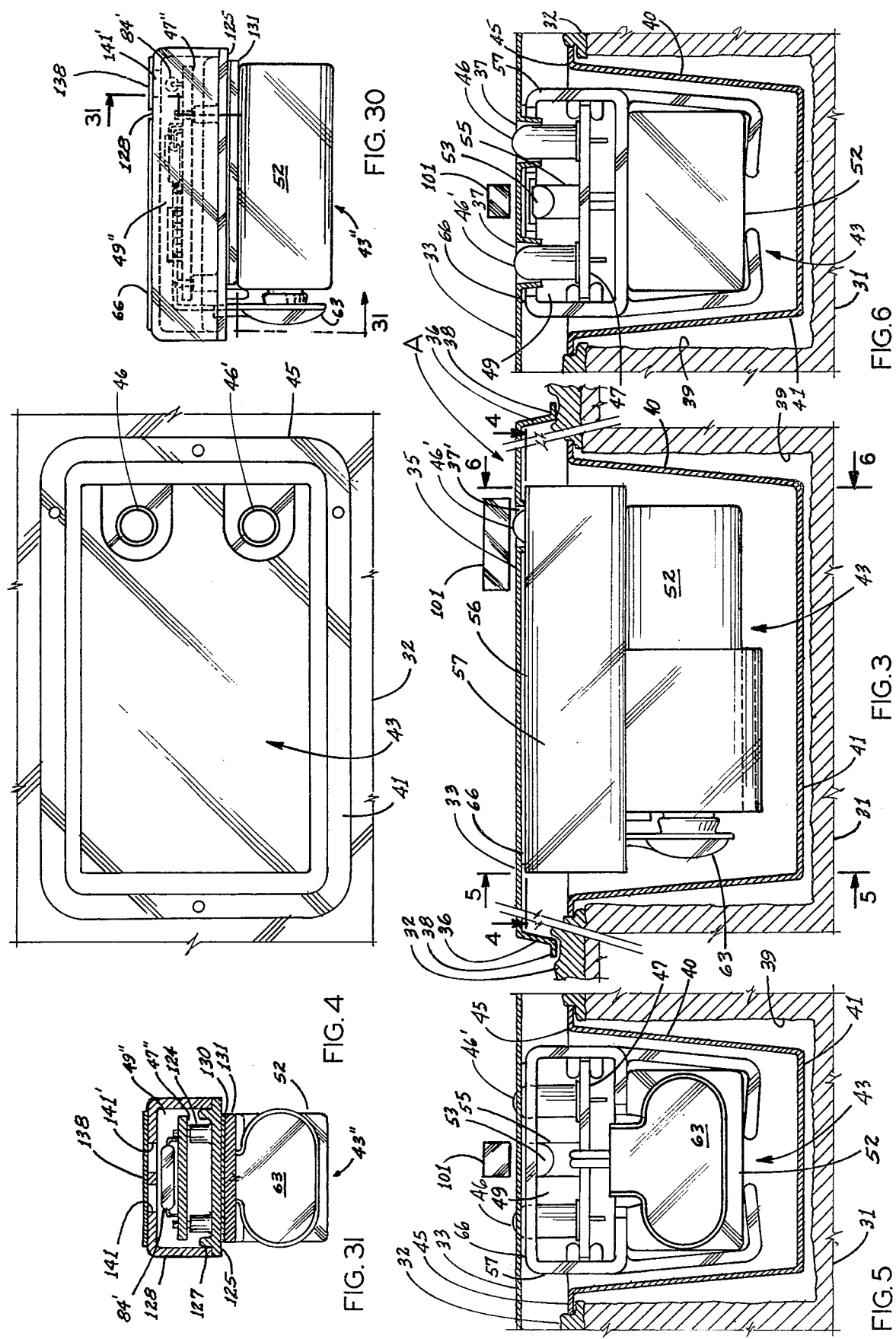

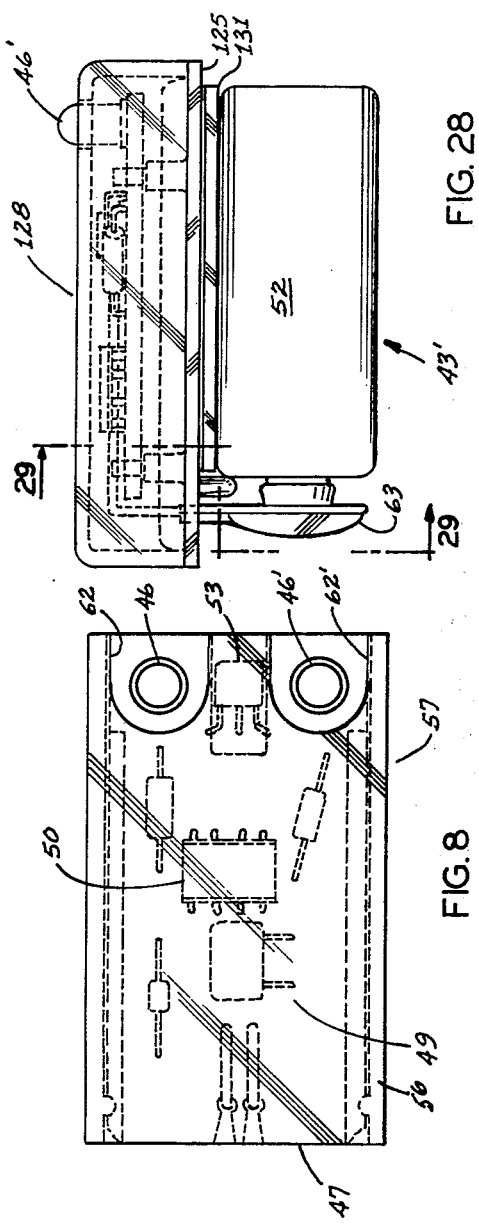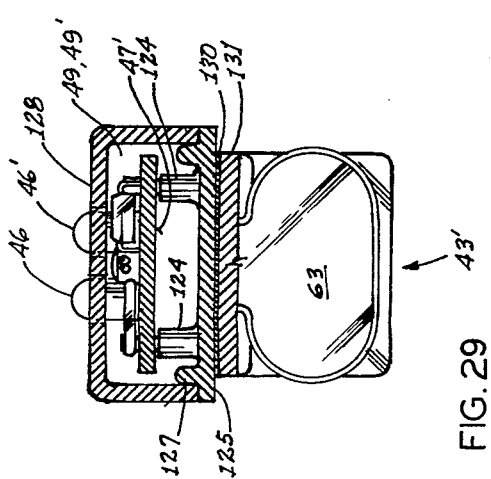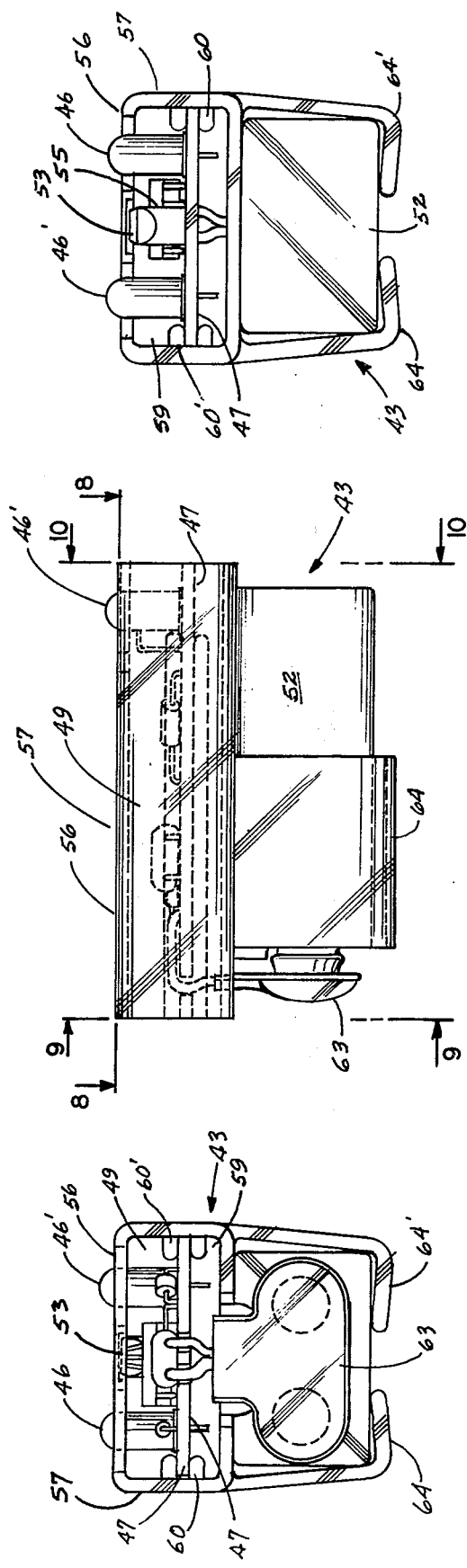

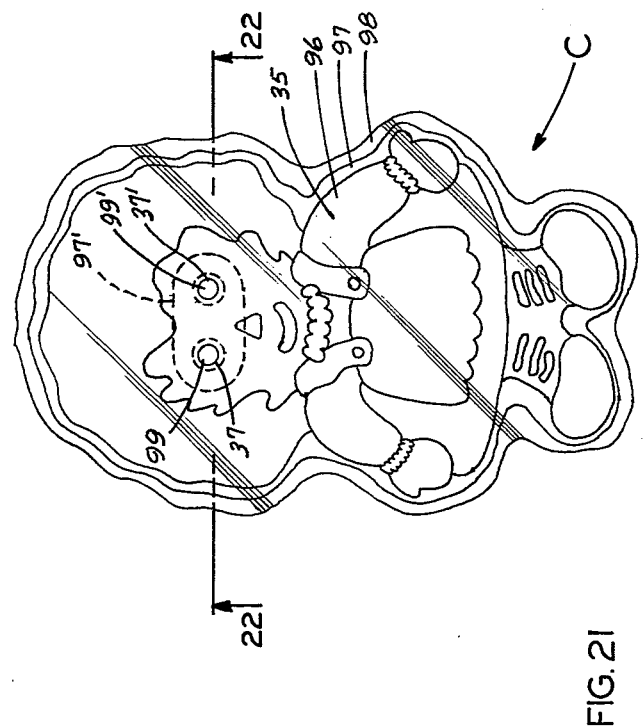
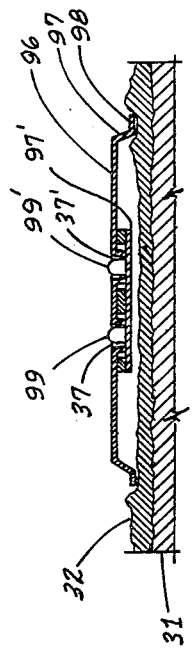
FIG. 21
FIG. 22
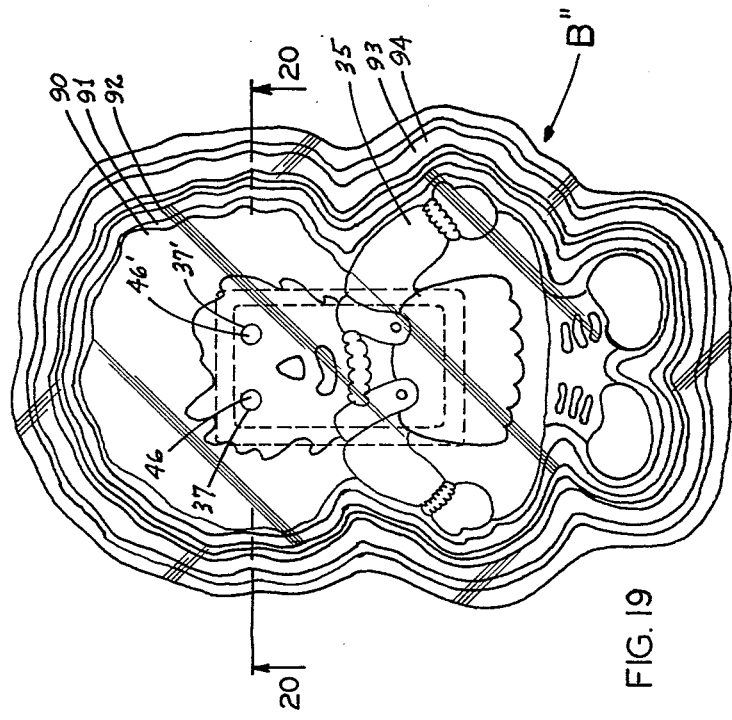
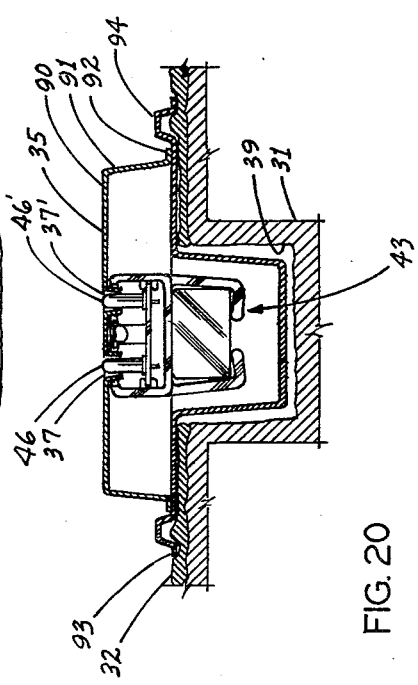
FIG. 19
FIG. 20

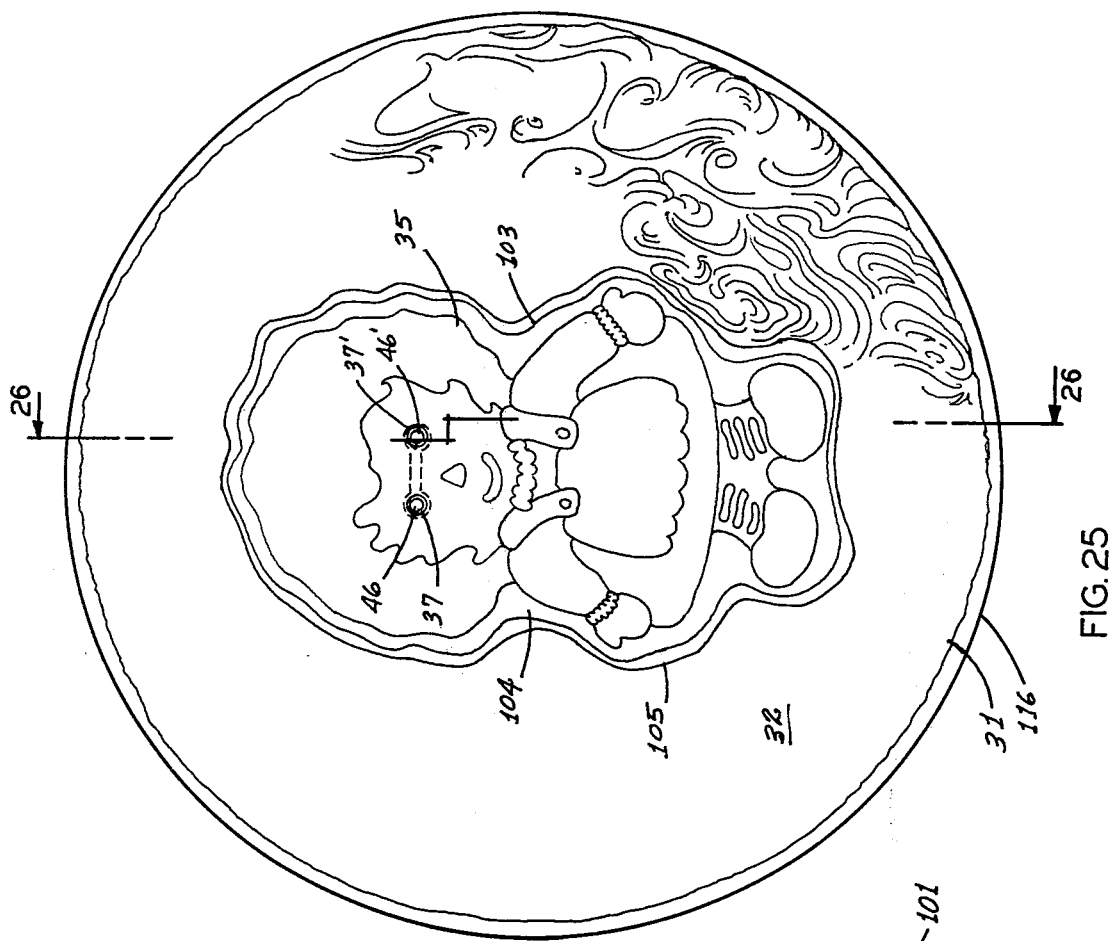
FIG. 25
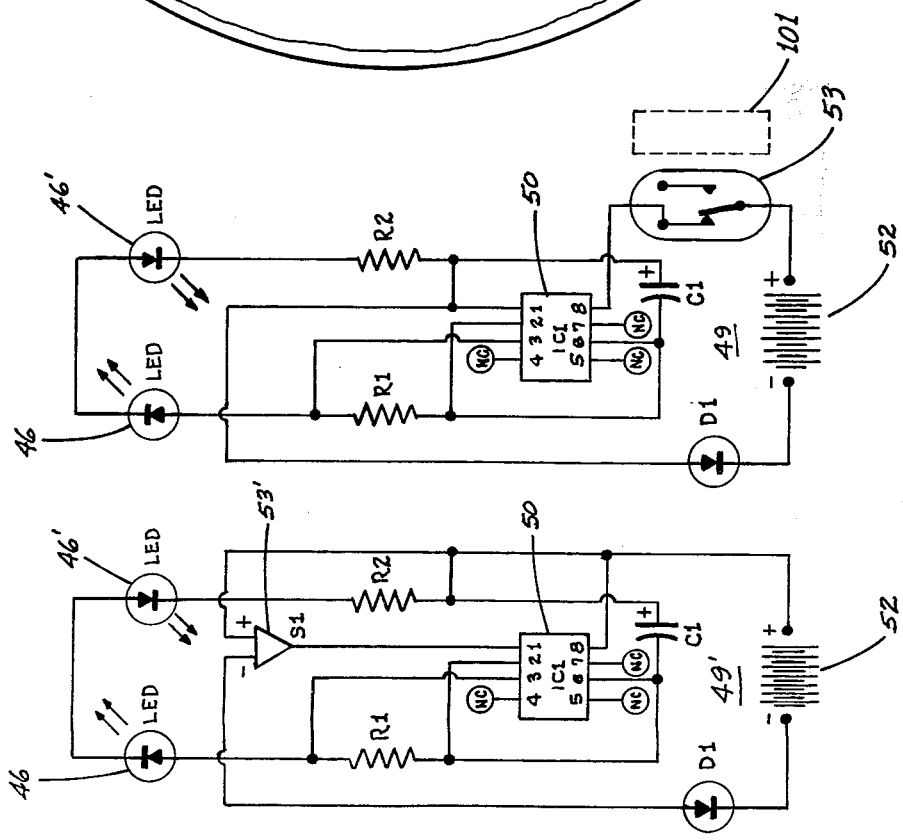
FIG. 23
FIG. 24

ILLUMINATED CAKE DECORATION

BACKGROUND AND SUMMARY OF INVENTION

This invention relates to cake decorating accessories and, more particularly, to cake decorations of an illuminated characteristic, for decorating cakes and other food products.

Ornamentation of various food products, such as cakes, confections, bread loaves, fruit cakes, and various other pastries is often carried out for the celebration of birthdays, holidays and various festive or similar occasions such as parties. And, as is well known, wedding cakes are sometimes very elaborately ornamented by various elaborate devices. Further, it has been proposed to provide various structures for holding candles atop cakes, as disclosed in McNeill U.S. Pat. No. 2,468,505. A decorative illuminating device intended to position light bulbs on a structure presented above a cake is disclosed in Propp U.S. Pat. No. 1,707,539. Marchand U.S. Pat. No. 2,439,178 typifies an illuminated ornament of the type utilized for being placed atop a birthday cake or the like. Biertuempfel U.S. Pat. No. 1,847,687 discloses a cake base having various sockets for electric lights to be powered by household AC voltage.

These typical prior art cake decorating accessories, including those providing electrical illumination, are characterized by structure which extend over or under a cake and which holds candles or light bulbs which project around or above the cake surface. Such devices are not compatible wth the kind of cake decoration where there are, applied to the surface of the cake or other pastry, decorations which are desirably present at the surface of the cake. Thus, it has not been known heretofore to provide illuminated cake decorating accessories in which the illumination is presented at the same level as the upper surface of the cake, so as to blend in with or be compatible with other decorations present on the surface of the cake, etc., nor to provide an effectively concealed, compact lighted decoration wherein the ligh sources, power and circuitry are hidden in an entirely unobvious manner.

Of course, a more mundane, customary or usual manner of cake decoration involves use of candles. Yet, burning of candles as decoration provides a short duration effect; presents the inherent danger of fire as well as posing danger of burns from flame, melting and dripping wax; offers the usually-encountered difficulty in lighting the candles or keeping them burning at the same or desire time; results in uneven burning as well as presenting the unattractive, even repulsive appearance of melted wax and candle matter; and typically is used in conjuction with sugar based decorations which not only are not of good nutritional, healthy character, but are also fragile, thus easily and frequently broken before or after being placed on a cake or the like.

Accordingly, it is an object of the present invention to provide improved illuminated decorations for cakes and other food products such as pastries, confections, loaves, fruit cakes, and the like, as well as various other edible products which can be ornamentally decorated.

It is another object of the invention to provide an electrically illuminated decoration for a cake or other food product which presents illumination at substantially the level of the upper surface of the cake, etc.

Further objects of the invention are to provide an electrically illuminated cake decorating accessory which is entirely self-contained, including its own long-lasting source of power for illumination; which is extremely compact, being of miniaturized construction; and which, when utilized for cake decorations, is entirely hidden and concealed in use, providing an illumination surface which is essentially flush with an ornament or decoration atop the cake, etc.

Another object of the invention is the provision of such an illuminated cake decorating accessory which provides for use without causing disturbance of the surface of a cake, and without permitting icing, condiments, or other food products from interfering with or entering the illumination mechanism and circuitry therefore.

Yet another object of the invention is the provision of such an illuminated cake decorating accessory which provides an extremely eye-catching, attractive, visual effect for high-lighting and enhancing various cake decoration themes as well as complimenting other decorations and design aspects of cake decorations embodying or used in conjunction with the invention.

A further object of the invention is the provision of such a cake decorating accessory which is battery powered, and which includes a magnetically responsive switching arrangement permitting selective switching on or off of the accessory, such as for convenience or as desired for effect, or to prolong battery life.

A further object of the invention is the provision of such an illuminated cake decorating accessory which provides a wholly novel manner of decorating cakes, etc., by allowing the effective use of various characters, figures, and theme type decorations having illuminated features.

Further objects of the invention include the provision of such a cake decorating accessory which is of a safe, inedible, non-toxic, hygienic character; which is not only reusable but easily cleaned; which is easily assembled and placed in use; which provides extremely quick, efficient cake decoration without the usual elaborate laborious and painstaking effort heretofore required; and which is very economically and easily manufactured, being thus amenable to low-cost production line economy.

Other objects and features will be in part apparent and in part pointed out hereinbelow.

BRIEF DESCRIPTION OF THE DRAWINGS

FIG. 3 is an enlarged vertical cross sectional view of the cake decorating accessory, showing a certain circuit module thereof for providing flashing illumination of lights of the accessory, and taken generally along line 3—3 of FIG. 1.

FIG. 4 is a top plan view of the circuit module, including a receptacle for it.

FIG. 5 is a vertical cross sectional view of the circuit module, including portions of a decorative cover, taken generally along line 5—5 of FIG. 3.

FIG. 6 is a similar vertical cross sectional view taken generally along line 6—6 of FIG. 3.

FIG. 7 is a side elevation view of the circuit module, with circuit portions thereof being illustrated by dashed lines.

FIG. 8 is a top plan view of the circuit module, similarly showing circuit components in dashed lines.

FIG. 9 is a left end elevation of the circuit module of FIG. 7.

FIG. 10 is a right end elevation of the circuit module of FIG. 7.

FIG. 19 is a top plan view of a further modification of the cake decorating accessory of the general type shown in FIG. 18.

FIG. 20 is a vertical cross section view taken generally along line 20—20 of FIG. 19.

FIG. 21 is a top plan view of a simplified cake decorating accessory of the invention.

FIG. 22 is a vertical cross sectional view thereof taken generally along line 22—22 of FIG. 21.

FIGS. 23 and 24 are schematic circuit diagrams typical of electrical circuitry utilized for cake decorating accessories of the invention.

FIG. 25 is a plan view of a cake decorating accessory of the invention utilizing a different arrangement for providing illumination thereof, the decoration being shown applied to a cake.

FIG. 28 is a side elevation view of a further version of the circuit module, with circuit portions thereof being illustrated by dashed lines.

FIG. 29 is a vertical cross-sectional view of the module of FIG. 28, taken generally along line 29—29 thereof.

FIG. 30 is a side elevation of yet a further version of the circuit module, with circuit portions thereof being illustrated by dashed lines.

FIG. 31 is a vertical cross-sectional view of the module of FIG. 30, taken generally along line 31—31 thereof.

Corresponding reference characters indicate corresponding parts throughout the several views of the drawings.

DESCRIPTION OF THE PREFERRED EMBODIMENTS

With regard to the embodiments of the invention described hereinbelow, reference is made to Disclosure Document No. 093083 dated Aug. 12, 1980, continued preservation of which is requested.

Figure 1:
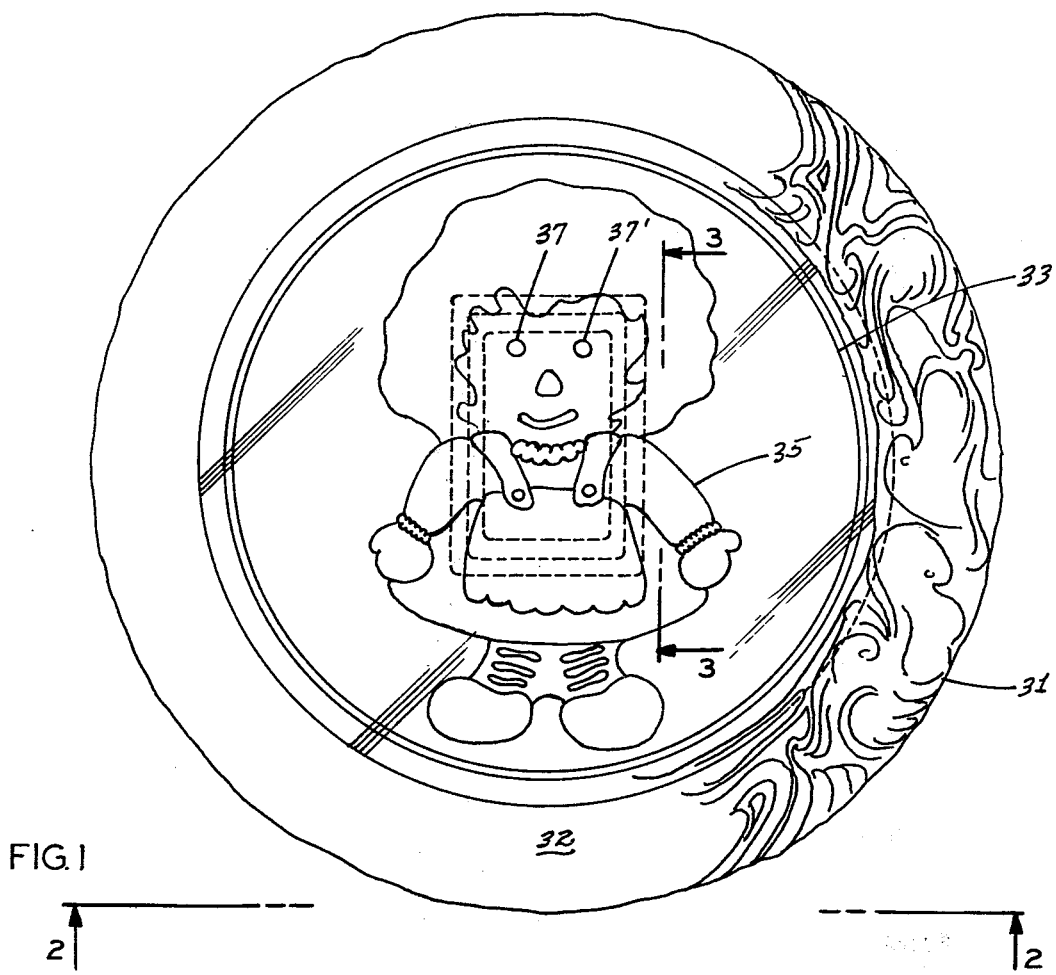
FIG. 1 is a plan view of a cake provided with a lighted cake decorating accessory and constructed in accordance with and embodying the present invention.

Referring to the drawings, and in particular to FIG. 1, wherein is illustrated one of various embodiments of an illuminated cake decorating accessory, generally designated A, capable of depicting various stylized designs, characters, and thematic or ornamental shapes, such as Christmas trees, pumpkins, and other special occasion decorations and motifs which may be placed atop a cake, such as at 31, or other food products such as pastries, confections, loaves, fruit cakes, wedding cakes, theme cakes, or various other kinds of comestibles, which may include typical icing layer or otherwise surface 32. Therefore, cake 31, with icing layer 32, is merely representative of but one of various kinds of food products which may be capable of decoration. Said decoration may be such as for the purpose of celebrating holidays, birthdays, various other special or festive occasions such as parties, or simply for such as to enhance the mood in which the said food product is to be served.

Accessory A is illustrated comprising a disc-shaped plate portion being referred to as cover plate 33, as said plate partially covers the surface or icing layer 32 of cake 31. Cover plate 33 includes figure 35 thereon, with said figure 35 being in the character of a "Raggedy Ann" doll, but as such, merely depicting but one of said various stylized designs, characters, and thematic or ornamental shapes mentioned hereinabove which may be present upon the surface of said cover plate 33. Located within character figure 35 of cover plate 33 are light-transmissive portions 37, 37' for being illuminated from within or beneath by an electric light source. Said light-transmissive portions 37, 37' are shown in this example as being eye-defining, however, said light-transmissive portions may also define various other objects and anatomical features, etc., such as noses, mouths, balloons, and stars, etc. Accordingly, said light-tranmissive portions may also be of various quantities, sizes, and designs, including such as circles, ovals, stars, and alpha-numeric characters, etc. Such light-transmissive portions, as at 37, 37', being of transparent or translucent nature, may be of such as windows, lenses, color light filters, or may be in the form of apertures, etc.

Although cover plate 33 is shown to be of generally circular feature, it is to be understood that said cover plates of various quantities, size, shapes and designs may be provided upon such as the surface 32 of cake 31 without departing from the scope of the invention.

Figure 2:
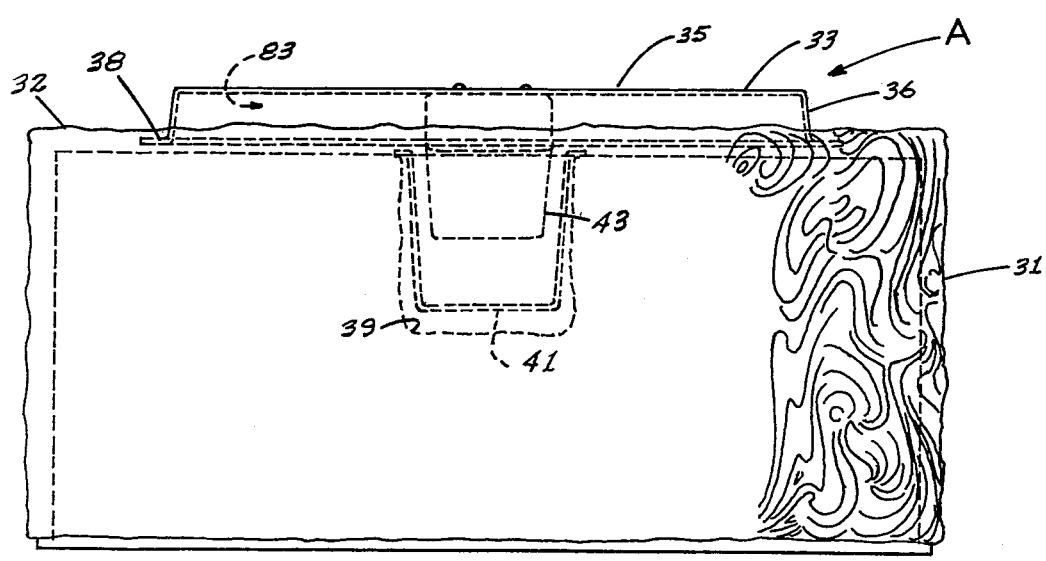
FIG. 2 is a side elevation of the cake, including cake decorating accessories, taken generally along line 2—2 of FIG. 1.

FIG. 2 illustrates cake 31, wherein is formed recess 39 for receiving generally rectangular housing 41 with circuit module 43 being contained therein; circuit module 43 being secured to cover plate 33. Cover plate 33 is of a certain discrete thickness with side wall 36 merging into radially extending flange 38, thus seating cover plate 33 upon icing layer 32 of cake 31.

For utilization of the invention, cake 31 is first prepared by having formed therein recess 39, such as by cutting into and removing a generally cubical configured portion of said cake 31 with a knife, fork, or other like utensil, thereby providing cake 31 with recess 39 of sufficient dimension for receiving generally correspondingly configured housing 41. Module 43 is suitably attached to cover plate 33, thereupon said cover plate 33 is positioned upon icing layer or otherwise surface 32 of cake 31; housing 41 receiving module 43.

FIGS. 3, 4, 5, and 6 illustrate the same embodiments of FIGS. 1 and 2, wherein recess 39 of cake 31 is shown receiving housing 41, with said housing 41, in effect, constituting a receptacle with containing circuit module 43. Housing 41 is of certain discrete thickness with side wall 40 merging into peripheral flange 45, thus to allow seating upon surface or icing layer 32 of cake 31. Circuit module 43 contains printed circuit board (PCB) 47 upon which is carried circuit 49 being connected by battery strap 63 to battery power source 52.

Circuit module 43 includes electric light sources 46, 46' being located within or beneath light-transmissive portions 37, 37' of cover plate 33 with upper surface 56 of said module 43 being detachably secured to the lower surface of said cover plate 33. The preferred method of said attachment being such as by double-faced adhesive layer 66 so as to reliably interengage circuit module 43 with cover plate 33, thus permitting said cover plate 33 to be positioned substantially at the same level as the upper surface or icing layer 32 of cake 31 while allowing simultaneous reception of circuit module 43 by housing 41. Said adhesive layer 66 may be pre-applied with a peel-back release coating to a cover plate, as at 33, such as at time of manufacture, or said adhesive layer 66 may be of such as a separate entity to be applied, in total, at time of use.

Therefore, upon removal of cover plate 33 from cake 31, circuit module 43 is simultaneously removed from housing 41, and as such, said circuit module 43 may be readily detached from said cover plate 33 by pulling against adhesive layer 66, thus to facilitate the interchange, reuse, or cleansing of same or different cover plates 33, which may be provided as described hereinabove. Separately, housing 41 may be simply pulled from recess 39 of cake 31.

Electric light sources 46, 46', of circuit 49, are shown being of such as a standard bi-pin or wire terminal base configuration being vertically positioned upon PCB 47 by such as solder means. In this example, electric light sources 46, 46' consist of light emitting diodes (LED's) protruding from within light-transmissive portions consisting of apertures 37, 37' of cover plate 33; said apertures 37, 37' being sufficiently large as to permit light from said light emitting diodes 46, 46' to emit through said aperture 37, 37' when said LED's 46, 46' are energized by said circuit 49 enclosed within circuit module 43. Electric light sources 46, 46' are preferably intermittently energized so as to be caused to flash, thereupon presenting a very novel and striking impression to the celebrant or other observer of the food product upon which the invention has been placed. Electric light sources, such as at 46, 46', may be of various natures, including such as incandescent, fluorescent, gas discharge, liquid crystal, and solid state, etc.

Circit 49, being carried upon PCB 47, is shown connected by battery strap 63 to battery power source 52. Control of circuit 49 is achieved by such means as normally closed miniature magnetic reed switch 53 being connected in series circuit with battery 52; said switch 53 being mounted upon stud 55 so as to extend from PCB 47 such as to position said switch 53 just beneath upper surface 56 of housing 57 of module 43 and thus beneath figure 35 of cover plate 33. Switch 53 may be caused to open by placement of such as permanent magnet 101 atop figure 35 over the region of said switch 53, thus to render circuit 49 inoperative, when such is desired.

In lieu of miniature magnetic reed switch 53 are various other switch components of manual and sensory types which may be employed for controlling operation of circuit 49. Said manual switch may be located for being accessible by lifting cover plate 33 from cake 31, thus to allow control of said circuit 49. Sensory switches, including, but not limited to, such of a magnetic, optical, vibration, temperature, capacitance, and air flow sensing types, may be located at or below figure 35 of cover plate 33. Apertures, if required, to the said sensory switch, may be such as to extend from figure 35 of cover plate 33 downward through upper surface 56 of housing 57 of circuit module 43, thus to allow access of the desired sensory medium, such as light, airflow, etc., thereby causing actuation of said sensory switch; said switch being located upon such as PCB 47.

Optionally, any switch, such as at 53, may be omitted from such as circuit 49; control of said circuit 49 then being achieved by such means as the connection and disconnection of battery strap 63 with battery source 52.

Housing 41 and cover plate 33 may be of molded synthetic resin material, as may be figure 35 thereon said cover plate 33. Accordingly, figure 35 may also be of such as cardboard, laminated paper, etc., or may be of painted, printed, or otherwise reproduced nature, but with all such materials and components constituting housing 41 and cover plate 33 being of durable, long-lasting, non-toxic, hygienic, and washable properties. Both housing 41 and cover plate 33, being of a non-electronic nature and of washable synthetic resin materials, may be readily cleansed by common means, such as by simple household detergents and water, without potential for damage. Circuit module 43, containing electronic circuitry 49 and being of a partially exposed nature, may be readily cleansed by such as wiping with a damp cloth or similar means.

In this regard, it is intended that food product decorative accessories of the invention, including housing 41 with circuit module 43 and same different cover plates 33, etc., be capable of reuse for many different occasions, thus to allow for the decoration of other cakes, pastries, and like decoratable food products.

Among the numerous materials which may be employed in constructing the components of housingf 41 and cover plate 33 are various synthetic or so called molded plastic materials of a resilient nature, such as injection molded thermoplastics including polystyrene, polyethylene, polypropylene, polycarbonate, nylon, polychlorotrifluorethylene, polytetrafluoroethylene, acrilo-butadiene-styrene (ABS) and various other polymers, copolymers, and terpolymers, etc.

FIGS. 7, 8, 9, and 10 illustrate, in more detailed manner, the embodiment of circuit module 43, wherein PCB 47 and battery 52 are supported by housing 57. Housing 57 defines a generally tubular enclosure 59 being of generally rectangular cross-section in which PCB 47 is positioned by such as horizontal ribs 60, 60', thus spacedly maintaining PCB 47 while permitting said PCB 47 to be axially inserted within tubular enclosure 59, thereby to position LED's 46, 46' within recesses 62, 62'. Battery strap connector 63 extends from PCB 47 for connection with battery 52; battery 52 being clampingly secured by opposingly oriented L-shaped extensions 64, 64' which extend from tubular housing 57 around the sides of said battery 52.

Circuit 49, including integrated circuit timer 50, is carried upon PCB 47 with said circuit being of such design as to provide intermittent energization (flashing) of LED's 46, 46'. Said flashing of each of LED's 46, 46' may be of an alternating, simultaneous, or random nature; however, the preferred mode of operation is that of being simultaneous. Optionally, LED's 46, 46' may be constantly energized with said energy being supplied at relatively fixed or variable intensities.

Figure 11:
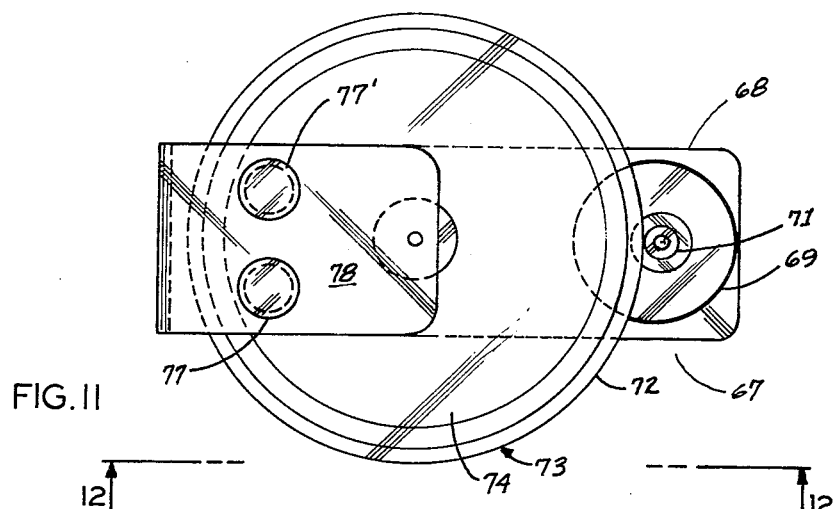
FIG. 11 is a top plan view of an alternative embodiment of a module for use with the decorative cover plate of the general type shown in FIG. 2.
Figure 12:
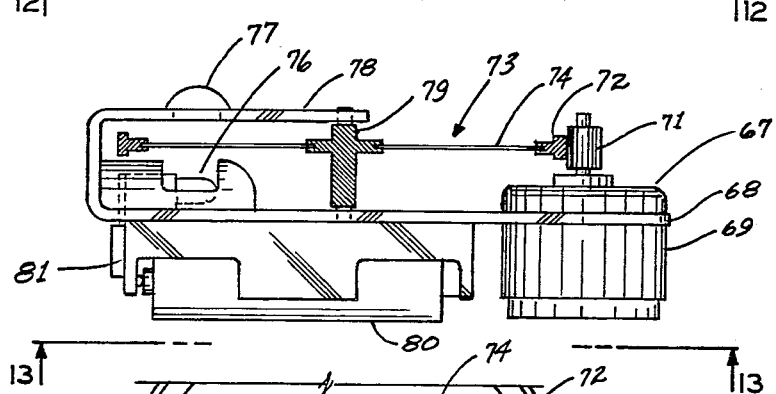
FIG. 12 is a side elevation of the module of FIG. 11, taken generally along line 12—12 of FIG. 11.
Figure 13:
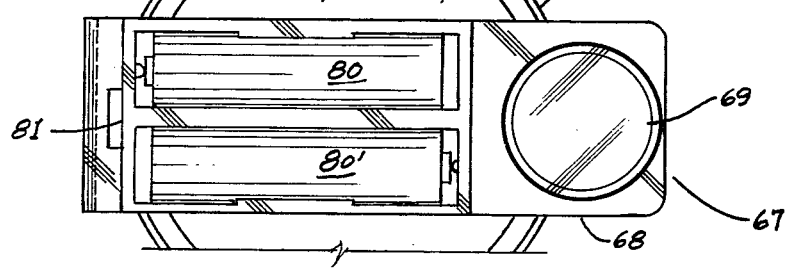
FIG. 13 is a bottom plan view of the module of FIG. 11.

FIGS. 11, 12, and 13 illustrate another embodiment of the invention, generally designated module 67, wherein said module is generally suitable for being received within a typical housing, as at 41, being inserted within a hollowed-out recess, as at 39 of cake 31, as shown in FIG. 2.

Module 67 includes bracket 68 to which is mounted motor 69 which, by means of drive roller 71, rotates peripheral flange or rim 72 of a wheel identified in its entirety at 73. Wheel 73 includes light-transmissive center portion or disc 74 which may be of various color or color patterns for interposition between electric light source 76, in this example comprising an incandescent lamp, and corresponding light-transmissive portions 77, 77' being, in this example, light-transmissive lenses carried in horizontally disposed extension 78 of bracket 68 of module 67; bracket 68 also providing a pivot for spindle 79 of wheel 73. Motor 69 and incandescent lamp 76 are provided power through a battery source, as at 80, 80', carried beneath the lower surface of bracket 68 within suitable battery holder 81. It is to be understood that lenses 77, 77' of module 67 are positioned such as to be located with such light-transmissive portions, as apertures 37, 37', of FIG. 35 of cover plate 33 described hereinabove and illustrated in FIG. 2. As wheel 73 rotates to bring the various color filtered portions of disc 74 between incandescent lamp 76 and lenses 77, 77' of module 67, the so-called eye-defining apertures or other light-transmissive portions, such as those at 37, 37', may be illuminated by various different lighting effects to produce unusual optical effects such as alternate winking, alternate flashing, and other various color effects within said light-transmissive portion as at 37, 37'. In this regard, various moving patterns, moire' patterns, light intensity changes, and even apparent movement, such as through the use of polarized or prismatic component materials of light-transmissive disc 74 and light-transmissive portions, such as at 77, 77', can be realized within light-transmissive portions, such as apertures 37, 37' of cover plate 33 of FIG. 1. Rotation of wheel 73 occurs wholly within a space, as designated at 83, which is located beneath cover plate 33 and above surface 32 of cake 31 or other decoratable food product as illustrated in FIG. 2.

It is further contemplated that rotation of wheel 73 may also cause generation of various audio effects. For this purpose, motor 69 may drive a disc, such as at 74, on which sound is phonetically recorded, such as by means of a grooved phonographic or magnetic recording medium. Such recording medium may be moved past a conventional pick-up head, such as of a magnetic type, which, when coupled to suitable electronic circuitry, may provide for such as the reproduction, amplification, and transduction of said recorded sound. Further, said circuitry may also include various sound producing integrated circuit components including such that of the type which are not presently available.

Figure 14:
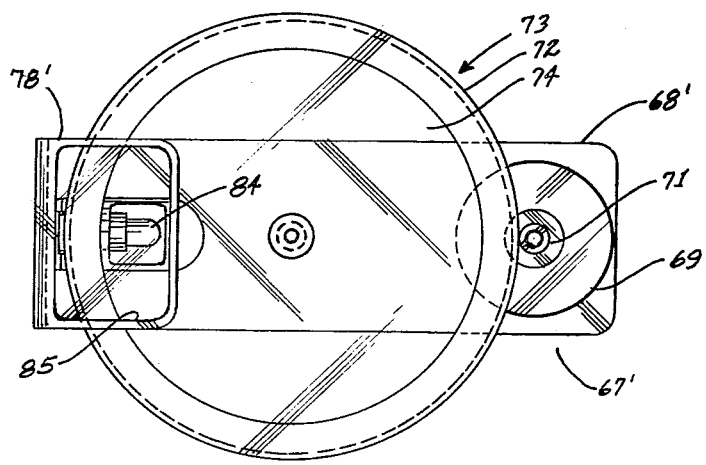
FIG. 14 is a top plan view of yet another module constituting a variation of that shown in FIG. 11.

FIG. 14 illustrates the provision of a further module designated 67', wherein is provided electric light source 84, again in the form of an incandescent lamp, with a relatively large light-transmissive portion 85 comprising, in this example, a window of suitable transparent material; said window being in upper horizontally disposed extension 78' of bracket 68'; extension 78' corresponding to extension 78 in FIGS. 11 and 12. Accordingly, it is to be understood that a relatively large light-transmissive portion, corresponding to window 85, may be utilized in lieu of the smaller eye-defining light-transmissive portions 37, 37' of figure 35 of cover plate 33 illustrated in FIG. 1. Therefore, figure 35 upon cover plate 33 may include a scene or the like to be displayed in a light-transmissive aperture or window of considerable size. Thus, disc 74 may have upon it various pictures, figures, or even such as a series of characters or scenes, etc. to be displayed sequentially through said relatively large light-transmissive portion provided in cover plate 33.

Further, light-transmissive portion 85 of module 67' may also be of such as a 2-layer polarized graphic film composite, thus being a simple 2-step animation wherein each step, or graphic film layer, is of a different animated sequence and is light polarized in such a manner as to be of different light polarity. Said disc 74, being a light-transmissive disc of correspondingly different light filtering polarities, is positioned so as when rotated between a non-polar light source, such as incandescent lamp 84, and light-transmissive portion 85, in this example comprising said 2-step polarized animated graphic film composite, causes radiated light rays from said incandescent light source 84 to correspondingly alternate in polarity, thus to sequentially strike said graphic film composite 85 in same manner, thereupon sequentially illuminating each of said polarized graphic layers so as to provide a simple 2-step animation to be viewed through such as a relatively large light-transmissive aperture provided in a cover plate as at 33 of FIG. 1, herein described above.

Figure 15:
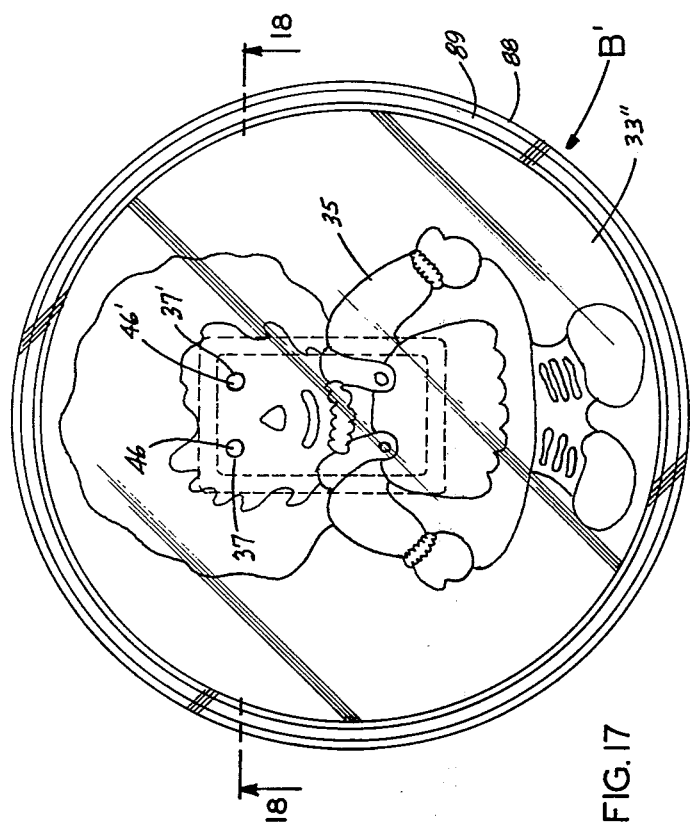
FIG. 15 is a top plan view of yet another version of a cake decorating accessory of the invention, which includes a circuit module which is carried by a decorative cover.
Figure 16:
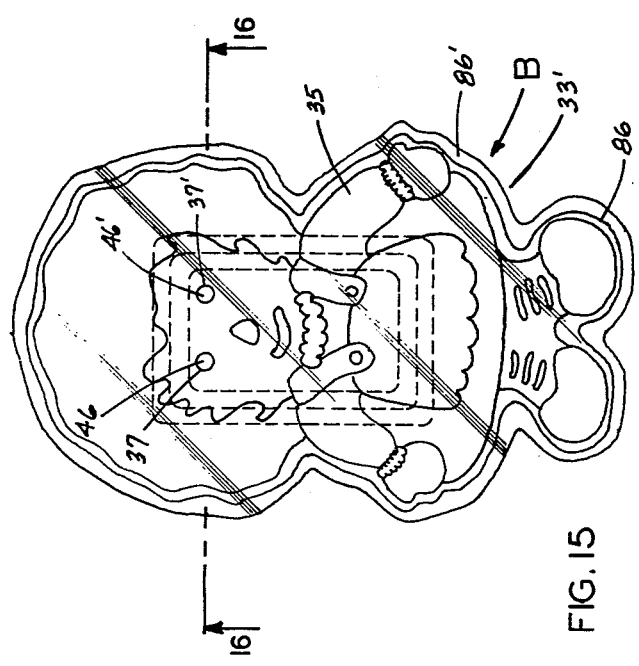
FIG. 16 is a vertical cross sectional view taken generally along line 16—16, of the accessory of FIG. 15.

FIGS. 15 and 16 illustrates another version, generally designated B, of the same general embodiment described and illustrated in FIGS. 3, 4, 5, and 6, wherein Figure 35 is shown suitably provided upon cover plate 33', however, said cover plate 33' is of a configuration conforming generally to the design of said figure 35 rather than being of the generally circular nature described hereinbefore and illustrated in FIGS. 1 and 2. Said cover plate 33 is shown having side wall 86 terminating in peripherial flange 86' for being seated upon icing layer or otherwise surface 32 of cake 31. Formed within said cake 31, is recess 39 for receiving housing 41 having a peripheral flanged lip 45·seated upon same icing layer 32; circuit module 43 being secured to the under surface of cover plate 33' as by previously described double-faced adhesive tape, etc.

Figure 17:
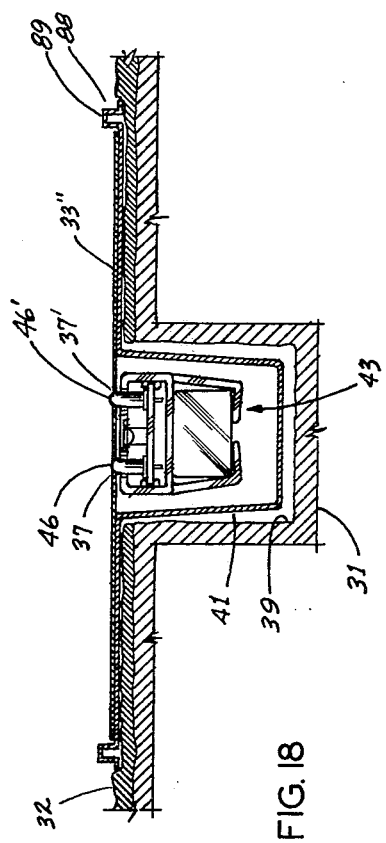
FIG. 17 is a top plan view of yet another version of a cake decorating accessory.
Figure 18:
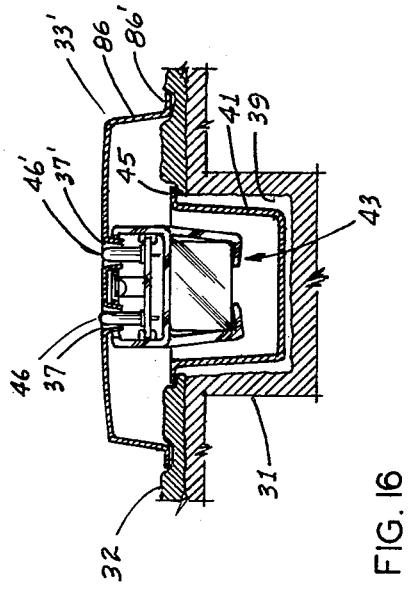
FIG. 18 is a vertical cross sectional view thereof taken generally along line 18—18 of FIG. 17.

FIGS. 17 and 18 illustrate another version of the same general embodiment, generally designated B', wherein cover plate 33" being of a generally circular configuration is seated within upstanding boss 89 of base plate 88 having formed therewithin rectangular well-like housing 41 for receiving a module, as at 43, being suspended, such as by double-faced adhesive tape or the like, from cover plate 33" upon which character figure 35 is suitably imprinted, overlaid, or otherwise provided thereon, such as by silk screening, etc. Embodiment B' provides an arrangement of components which are particularly easy to use as module 43 may remain secured to cover plate 33" which is then simply set within boss 89 of base plate 88 being seated upon surface or icing layer 32 of cake 31 or other food product when the invention is ready for use. Thus, cover plate 33", with detachably secured module 43, may be easily removed from cake 31 by simply lifting said cover plate 33" from base plate 88, whereupon base plate 88 may also be lifted from said cake 31 to allow for such as the cutting of portions of said cake 31 and the cleansing of said base plate 88.

FIGS. 19 and 20 illustrate yet another version of the embodiment, generally designated B", with various features of embodiments B and B' being combined therein. Cover plate 90 is shown having side wall 91 merging into peripherial flange 92 being seated upon base plate 93 within raised boss 94; all conforming in a generally concentric manner to the shape of the design of FIG. 35.

Embodiments B, B', and B" may incorporate a magnetic switching arrangement which may be utilized for selectively enabling or disabling the flashing LED operation of the circuitry, as at 49, of a module as at 43 of FIGS. 5 and 6.

FIGS. 21 and 22 illustrate a simplified embodiment of the cake decorating accessory, generally designated C, wherein cover plate 96, having downwardly extending side wall 97 merging into peripherial base flange 98, is seated upon icing layer 32 of cake 31. Provided beneath cover plate 96, as by previously described detachable adhesive securement, is plate-like fixture 97 upon which are located light radiating beads 99, 99'; said beads 99, 99' being, in this example, of a material of phosphorescent properties, thereby providing the doll-like figure 35 with what appear to be glowing eyes through eye-defining light-transmissive portions being in the form of apertures 37, 37' of cover plate 96. Such represents a passive illumination technique wherein said beads 99, 99' effectively capture ambient radiation, such as visible room light, thereupon not only becoming luminous, but continuing to luminesce for a period of time after the removal of the exciting radiating agent, thus said eyes appear to glow or sparkle, but require no direct source of electrical energy. Said light radiating beads may also be of a material of a reflective or simple luminous nature.

Accordingly, embodiment C, as a single entity, is simply placed atop icing layer or surface 32 of such as cake 31, thus requiring no special preparation or modification, such as that of preparing a recess, as at 39 illustrated in FIG. 20.

FIGS. 23 and 24 illustrate circuits 49, 49' respectively, which may be utilized for the construction of circuit modules such as at 43, 43' of FIGS. 7 and 28 respectively.

Referring to FIG. 23, wherein circuit 49 includes integrated circuit time 50 which is provided power from battery 52 through the normally closed contacts of miniature magnetic reed switch 53 which may be disabled by such as a simple bar magnet, as at 101, being placed atop figure 35 over the region of said switch 53. Diode D1 is shown connected in series circuit with integrated circuit timer 50, battery 52, and switch 53, thus protecting circuit 49 by providing current of only correct polarity thereto. Interconnected with circuit 49 in conventional fashion are timing control components capacitor C1 and resistor R1; similarly connected in series circuit are current limiting resistor R2 and LED's 46, 46' which, when enabled by switch 53, are intermittently energized by integrated circuit timer 50 so as to flash at a rate so determined by said timing components.

Accordingly, circuit 49 may also utilize other sources of electric light in lieu of LED's 46, 46' shown; said electric light sources including such as incandescent lamps, etc., previously described hereinabove.

Referring to FIG. 24, wherein is illustrated another version of circuit 49, generally designated 49', utilizing a magnetic Hall effect switch 53' in lieu of magnetic reed switch 53, thus permitting power to be made selectively available to integrated circuit timer 50 when a magnet, as at 101, is placed atop figure 35 over a region of said switch 53'.

Accordingly, a Hall effect latch may be utilized in lieu of Hall effect switch 53'; a desirable aspect of the latch being the avoidance of the necessity of maintaining magnet 101 in constant magnetic induction with said latch component in order to maintain the desired open or closed latch state.

It is contemplated that various audio generating means may be incorporated into such as circuit 49'. Such audio generating means may consist, for example, of a miniature solid state audio tone generator with self-contained transducer of the type presently and commonly made available, such as that being a novelty type buzzer. Said tone generator may be connected in parallel circuit with current limiting resistor R2 and electric light source, such as LED's 46, 46', to operate an audio tone simultaneous with, and of the same duration as, that of the energized flash of said electric light source. Such audio generating means may also be of such as a single integrated circuit chip microcomputer with solid state miniature pizeo-electric transducer interconnected to a circuit, such as 49, via a driver transistor; said microcomputer chip may be programmed to provide such as melodious tones or other sound effects, etc. Accordingly, other sound, music, and speech type audio generating circuit means, such as those incorporating various integrated circuit components, including those of the Large Scale Integrated (LSI) circuit types, may be utilized for the generation of audio effects. Further, said audio generating circuits may employ various sound producing components including such as those which are not presently available. All such audio effects may be generated musically in time with the flashing energization of the electric light source, as at 46, 46' of circuit 49'.

Figure 26:
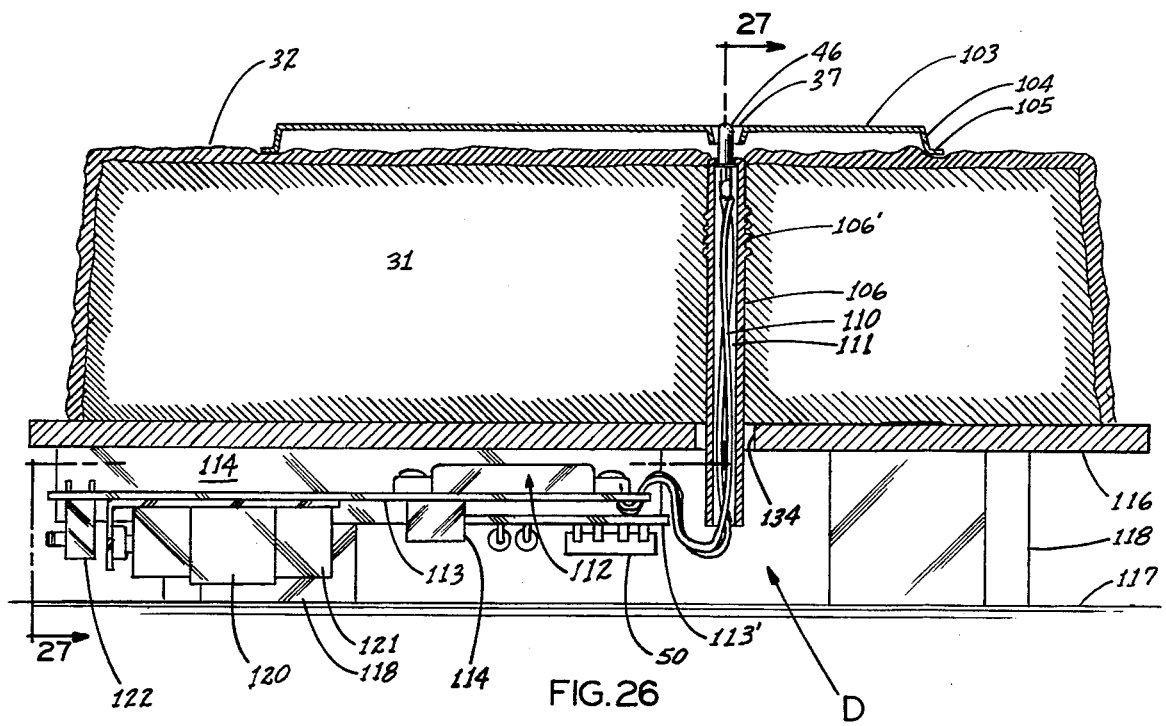
FIG. 26 is a vertical cross sectional view of the cake decorating accessory and cake of FIG. 25 and, showing also an electronic module located beneath the cake for providing illumination, all taken generally along line 26—26 of FIG. 25.
Figure 27:
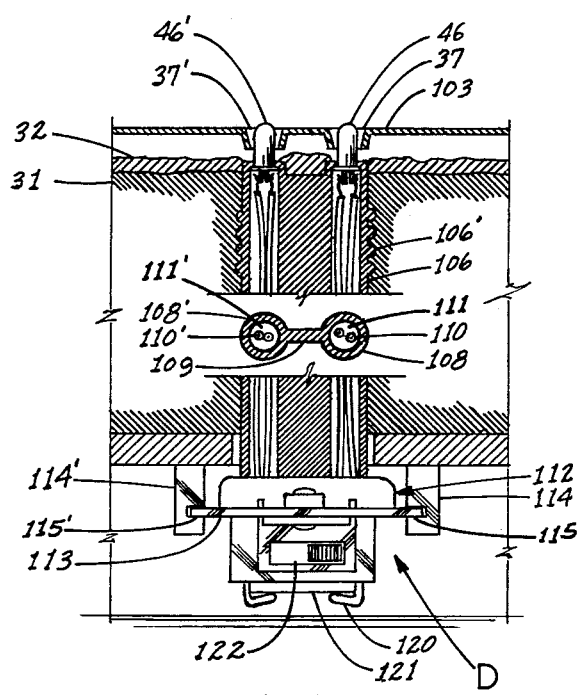
FIG. 27 is a partial vertical cross sectional view of the module of FIG. 26, and taken generally alone line 27—27 thereof.

FIGS. 25, 26, and 27 illustrate another embodiment of the invention, generally designated D.

Referring to FIG. 25, wherein cover plate 103 is of a shape generally conforming to the character representation of the "Raggedy Ann" design of figure 35 as previously illustrated. Cover plate 103 is seated upon icing layer or other surface 32 of cake 31. figure 35 includes light-transmissive portions consisting, in this example, of apertures 37, 37' within which are located electric light sources, such as LED's 46, 46'. Such LED's 46, 46' being representative of the eyes of said "Raggedy Ann" figure 35. Accordingly, said electric light sources may also consist of such as incandescent lamps being located beneath said light-transmissive portions; said light-transmissive portions being of such as various color filter materials.

Referring to FIG. 26, wherein cover plate 103 includes upstanding side wall 104 merging into a terminating peripherial flange 105 for being seated upon surface 32 of cake 31. Inserted in an upward manner through the texture of said cake 31 is elongated extension member 106 having LED's 46, 46' at the upper most end with said LED's 46, 46' being positioned within the eye-like apertures 37, 37' formed within cover plate 103; securement of said LED's 46, 46' being aided by such means as a series of closely spaced fins or projections 106' being placed near the LED carrying end of said extension member 106. Leads 110, 110' provide connection of member 106 to circuit 112, which may be one of the general configurations shown in FIGS. 23 and 24, with said circuit 112 being positioned upon PCB's 113, 113'; PCB 113' being connected to master PCB 113 by such means as a printed circuit edge board connector as at 114. Optionally, circuit 112 may be carried upon a single printed circuit board. Secured to the lower surface of PCB 113 is battery holder 120 including battery power source, as at 121, for providing power to circuit 112 when enabled by switch 122; said switch 122 being located proximate one edge of base plate 116 for actuation by the user.

Referring to FIG. 27, wherein extension member 106 is shown comprising two tubular portions 108, 108' interconnected by web 109 for maintaining structural integrity; said tubular portions 108, 108' defining cylindrical enclosures 111, 111' for receiving leads 110, 110' of LED's 46, 46'. Accordingly, such extension members may also be of a singular nature comprising only one electric light source, as at 46, and one tubular portion, as at 108. Such an embodiment of the invention may utilize one or more relatively smaller cover plates, each said cover plate containing a light-transmissive portion being illuminated therebeneath by an electric light source, as at 46, from one such singular extension member. Circuit 112 may be of such means as to illuminate multiple such cover plates in various sequential, random, and multiple fashions.

PCB 113 is shown being spacedly maintained and detachably secured by opposing horizontal recesses 115, 115' of brackets 114, 114' being affixed to the under surface of base plate 116, thus to allow the removal of said PCB 113 from said brackets 114, 114' to permit such as cleansing of said base plate 116, when such is desired. Base plate 116 may be maintained off table surface 117, etc. by suitable pedestal means, as at 118.

It is to be understood that being connected by leads 110, 110' with circuit 112, extension member 106 is not fixedly connected to base plate 116 or PCB 113, etc., thus extension member 106 is freely vertically positionable to allow for the placement of LED's 46, 46' at generally the same level or slightly above that of figure 35 upon cover plate 103 of cake 31. Accordingly, decoratable food product or cake 31 is placed upon base plate 116, thereupon extension member 106 is pressed upwardly through the porous texture of cake 31 until LED's 46, 46' extend above icing layer or surface 32 in such a manner as to allow LED's 46, 46' to extend upward from within apertures 37, 37' of figure 35 as illustrated. Base plate 116 may include at least one aperture, as at 134 of FIG. 26, of predetermined location so as to serve for such as a template or guide providing for the proper alignment of such as extension member 106 within or below such as apertures 37, 37', while providing for the desired spacial relationship of cover plate 103 to said cake 31.

Advantages of embodiment D include that of cake 31 or other decoratable food product requiring no special preparation, such as being hollowed-out to define a recess, as at 39, for receiving a circuit module, as at 43 of FIG. 3, rather being simply placed upon base plate 116 with probe-like extension member 106 being reliably retained within the soft sponge-like texture of said cake 31 by such as ribs 106'. Further, prior to serving cake 31, switch 122 is conveniently switched on to provide flashing illumination of LED's 46, 46' as described hereinbefore. Further, upon removal of cover plate 103 from cake 31, icing layer or surface 32 is substantially undamaged and no blemish, such as that resulting from the previously described hollowed-out recess, as at 39 of FIG. 3, is present to mar appearance of said cake 31. Further yet, PCB's 113, 113' may optionally carry various interchangeable sound producing integrated circuit components, including such as those which are not presently available which produce pleasant melodies, voices, and other sounds appropriate to the theme of the cake and the occasion for which the cake is to be served.

FIGS. 28 and 29 illustrate another version, generally designated 43', of the embodiment of FIGS. 3, 4, 5, and 6 wherein circuit means 49 are shown carried upon PCB 47' being seated upon posts 124 extending in an upward direction from base plate 125. LED's 46, 46' are shown protruding from within aperture 141, 141' of cover 128. Flanged rib 127 perimetrically extends base plate 125 upon which is seated cover 128, thus forming a box-like housing for enclosing and containing PCB 47'. Magnetic sheet material 131 is adhesively secured as by a layer of adhesive or double-faced adhesive tape 130 to the lower surface of said base plate 125; said layer of magnetic sheet material 131 being of sufficient magnetic strength so as to reliably maintain ferrous metal encased battery 52 in position beneath base plate 125 without resort to brackets, such as those of the embodiments illustrated in FIGS. 7 through 10. Module 43' may be reliably secured to a cover plate, such as at 33" of FIG. 18, by a double-faced adhesive layer or the like being interpositioned between the upper surface of cover 128 of said module 43' and the lower surface of said cover plate, as at 33".

Cover 128 and base plate 125 may be formed, as by injection molding, of suitable synthetic resin material as previously identified hereinabove.

FIGS. 30 and 31 illustrate yet another version of the embodiment of FIGS. 3, 4, 5, and 6, generally designated module 43", which may be detachably secured, such as by a double-faced adhesive layer 66 or like material, to a cover plate, as at 33" of FIG. 18.

Ferrous metal encased battery 52 is shown magnetically adhered to sheet magnet 131 being secured, by such as adhesive means, to the lower surface of base plate 125. Cover 128, being positioned by such as ribs 127, is seated upon the upper surface of base plate 125, thereby substantially enclosing and containing circuit means 49" carried upon PCB 47". Circuit 49", being a modified version of circuit 49, utilizes a single tubular microminiature incandescent lamp 84' of horizontally opposing twin leads as a source of electric light in lieu of such as LED's 46, 46'. Incandescent lamp 84' is shown positioned beneath light-transmissive portions, consisting in this example of apertures 141, 141' of cover 128, so as to radiate light upwards through said light-transmissive portions; said light-transmissive portions, being of transparent or translucent nature, may be of such as windows, lenses, or may be in the form of such as said apertures 141, 141'. Accordingly, a cover, such as at 128, may be formed or molded of suitable synthetic resin material of light-transmissive properties, thus being light-transmissive in itself and therefore not requiring such as apertures 141, 141' from which to emit said radiated light from said electric lamp 84'.

Optionally, lamp 84' may incorporate a light baffel and reflector to guide said radiated light in the desired direction and pattern.

Overlying apertures 141, 141' is illustrated light-transmissive material 138 consisting, in this example, of a layer of single faced adhesive coated translucent projection tape of a pre-selected color and light filtering nature. Said adhesively coated color filter layer 138 may be applied, as shown, so as to overlay light-transmissive portions, consisting in this example of apertures 141, 141', thus adhering to the upper surface of cover 128 of said module 43". Conversely, said color filter layer 138 may also be applied, in similar manner, to the lower surface of a cover plate, as at 33" of FIG. 18, but in any such utilization, said light-transmissive material 138 is to be located so as to be interpositioned between the light-transmissive portion, as at 37, 37', of a cover plate, such as at 33" of FIG. 18, and the electric light source, such as incandescent lamp 84', so as to filter radiated light from said incandescent lamp 84' thereby providing for the color illumination of said light-transmissive portion of said cover plate when viewed from above said cover plate; said cover plate, as at 33", being suitably attached to module 43". Suitable means of said attachment may be provided by such as double-faced adhesive layer 66 being applied upon upper surface of cover 128 so as to be compatibly positioned with respect to color filter material layer 138.

Color selectable filter material 138, being of an interchangeable and generally reuseable nature, combined with a module, as at 43", and a suitable cover plate containing light-transmissive portions, as at 33" of FIG. 18, allow for the invention to provide illumination of various colors, such as red flashing illumination of said light-transmissive portions for Christmas decorations, etc. green flashing illumination of said light-transmissive portions for St. Patrick's Day decorations, etc., or even for such as the color coordinating of said illuminated flashing light-transmissive portions with such as the color of the typical icing layer, as at 32 of a cake, as at 31 of FIG. 2. Such a visual effect could also be achieved through the use of various color filtered incandescent lamps, as at 84', or by the utilization of various filter or lens materials of select color being placed atop, formed within, or inserted into apertures such as at 37, 37' of a cover plate, such as at 33" of FIG. 18. Light-transmissive material 138 may also be of variable light-transmissive properties so as to provide for such as various designs, patterns, and alpha-numeric characters, etc. to be illuminatedly defined within said light-transmissive portions, as at 37, 37', of a cover plate, as at 33" of FIG. 18.

In view of the foregoing, it is seen that the several objects of the invention are attained with other advantageous results also being achieved.

Although the foregoing includes a description of the best mode of the embodiments envisioned for carrying out the intent of the invention, various modifications and combinations of the constructions and arrangements of the components described hereinabove and illustrated are contemplated without departing from the scope of the appended claims.

Therefore, all matter claimed in the foregoing descriptions and shown in the accompanying drawings is to be interpreted as illustrative rather than limiting.

What I now claim is:

1. A food product decorating accessory for providing illuminated decoration on the surface of a cake or other similarly decoratable food product; said accessory including a decorative cover plate for being applied externally to and upon said surface of said cake; said cover plate overlying at least a portion of said surface of said cake; said cover plate having at least one portion thereof to allow for the transmission of light through said cover plate; illumination means being located below said cover plate for providing a light source visible through said light-transmissive portion of said cover plate when viewed from above said cover plate by an observer of said cake.

2. A food product decorating accessory according to claim 1 and further characterized by said light-transmissive portion of said cover plate being in the form of an aperture; said illumination means comprising a bead of light radiating material secured to said cover plate from therebeneath for receiving radiant energy at said aperture and radiating light through same said aperture.

3. A food product decorating accessory according to claim 2 and further characterized by said cover plate being decorated in the form of a doll or like character and having at least one eye-defining light-transmissive portion providing an eye for said doll or like character; said illumination means providing a light source visible through said light-transmissive portion of said cover plate thereby providing the visual effect of a lighted eye.

4. A food product decorating accessory according to claim 1 and further characterized by said illumination means including at least one electric light source, a battery for providing a source of energy for said light source, and circuit means for interconnecting said light source with said battery.

5. A food product decorating accessory according to claim 4 and further characterized by said electric light source comprising a light emitting diode (LED); said illumination means comprising a tubular extension including at least one said LED at one end thereof; said extension member being configured for vertically extending through said cake from the bottom to the top; said decorating accessory including a plate-like base for supporting said cake, means for maintaining said circuit means below said plate-like base, and flexible circuit leads interconnecting said extension member and said circuit means; said circuit means providing flashing energization of said LED; said plate-like base including at least one aperture of predetermined location providing for the proper locating of said extension member beneath said cake.

6. A food product decorating accessory according to claim 4 and further characterized by said electric light source, said battery, and said interconnecting circuit means forming a module; said module securable to said cover plate therebeneath; said module receivable within a recess within said cake; said cover plate overlying said recess.

7. A food product decorating accessory according to claim 6 and further characterized by said module including a light-transmissive disc positioned for rotation in a plane substantially parallel to that of said surface of said cake, and a motor for rotatably driving said disc to bring variable light-transmissive portions thereof between said electric light source and said light-transmissive portion of said cover plate, thereby to produce visible variable light-transmission through said light-transmissive portion of said cover plate.

8. A food product decorating accessory according to claim 6 and further characterized by a receptable constituting a well-like housing for being received within said recess within said cake; said module being receivable by said housing; said cover plate overlying said housing.

9. A food product decorating accessory according to claim 8 and further characterized by said housing including a flanged peripherial portion constituting a base plate for overlying said cake; said cover plate overlying said base plate.

10. A food product decorating accessory according to claim 6 and further characterized by said circuit means providing flashing energization of said electric light source.

11. A food product decorating accessory according to claim 10 and further characterized by said circuit means, for electrically switching power from said battery to said electric light source, including a solid state timing device.

12. A food product decorating accessory according to claim 10 and further characterized by said electric light source comprising a light transmitting diode (LED) to be energized by said circuit means.

13. A food product decorating accessory according to claim 10 and further characterized by said electric light source comprising an incandescent lamp to be energized by said circuit means.

14. A food product decorating accessory according to claim 13 and further characterized by light-transmissive material, of a color filtering nature, being interpositioned between said light-transmissive portion of said cover plate and said incandescent lamp so as to provide for color illumination being visible through said light-transmissive portion of said cover plate when viewed from above said cover plate.

15. A food product decorating accessory according to claim 6 and further characterized by said circuit means including a magnetically responsive switching device located below said cover plate; said switching device being operative in response to a magnetically induced field of sufficient strength being applied atop said cover plate; said switching device for enabling and disabling power from said battery to said electric light source.

16. A food product decorating accessory according to claim 6 and further characterized by said battery being ferrous metal enclosed; said module having magnetic material secured thereto so as to provide for the magnetic means of adhering said battery to said module.

17. A cake decorating accessory for providing illuminated decoration on the surface of a cake or the like; said decoration including a decorative cover plate for being applied externally to, and upon, the surface of said cake for covering a portion of said surface; said cover plate being decorated in the form of a doll or like character and having two eye-defining apertures providing the eyes of said doll or like character; illumination means below said cover plate for providing illumination for being viewed above said cover plate by an observer of said cake; said illumination means consisting of an electric light source visible through said apertures for providing the visual effect of lighted eyes; a battery power source for energizing said electric light source; circuit means for interconnecting said electric light source and said battery; said interconnecting circuit means for providing flashing energization of said electric light source; said battery and circuit means being located below said cover plate; a well-like housing for being received within a recess within said cake; said electric light source, said battery, and said interconnected circuit means forming a module; said module being securable to said cover plate therebeneath for being received within said housing; said cover plate overlying said recess.

18. A food product decorating accessory according to claim 17 and further characterized by said electric light source consisting of one light emitting diode (LED) for emitting light through each said aperture.

19. A food product decorating accessory according to claim 17 and further characterized by said electric light source consisting of at least one incandescent lamp for emitting light through said apertures, and a layer of light-transmissive material of a color filtering nature being interpositioned between said apertures and said incandescent lamp so as to provide for color illumination being visible through said apertures when viewed from above said cover plate.

* * * * *